(12) United States Patent
Desai et al.

(10) Patent No.: US 7,567,968 B2
(45) Date of Patent: Jul. 28, 2009

(54) INTEGRATION OF A NON-RELATIONAL QUERY LANGUAGE WITH A RELATIONAL DATA STORE

(75) Inventors: Arpan A Desai, Bothell, WA (US); Daniel Dedu-Constantin, Redmond, WA (US); Ion Vasilian, Seattle, WA (US); Todd F Pfleiger, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 290 days.

(21) Appl. No.: 11/046,693

(22) Filed: Jan. 31, 2005

(65) Prior Publication Data

US 2006/0173804 A1 Aug. 3, 2006

(51) Int. Cl.
G06F 17/30 (2006.01)

(52) U.S. Cl. .................. 707/10; 707/104.1; 709/203

(58) Field of Classification Search .................. 707/3, 707/102, 2, 4, 10, 104.1; 715/513; 709/203
See application file for complete search history.

(56) References Cited

U.S. PATENT DOCUMENTS

| | | | | |
|---|---|---|---|---|
| 5,701,461 | A * | 12/1997 | Dalal et al. | 707/4 |
| 6,560,598 | B2 * | 5/2003 | Delo et al. | 707/4 |
| 6,571,232 | B1 * | 5/2003 | Goldberg et al. | 707/2 |
| 6,636,845 | B2 * | 10/2003 | Chau et al. | 707/1 |
| 6,708,164 | B1 | 3/2004 | Cseri et al. | |
| 6,799,184 | B2 * | 9/2004 | Bhatt et al. | 707/102 |
| 7,181,456 | B2 * | 2/2007 | Huang | 707/10 |
| 7,529,753 | B1 * | 5/2009 | Ewing | 707/10 |
| 2002/0016814 | A1 | 2/2002 | Convent et al. | |
| 2002/0059187 | A1 * | 5/2002 | Delo et al. | 707/1 |
| 2003/0191769 | A1 * | 10/2003 | Crisan et al. | 707/100 |
| 2003/0236859 | A1 * | 12/2003 | Vaschillo et al. | 709/218 |
| 2004/0015478 | A1 * | 1/2004 | Pauly | 707/1 |
| 2004/0015481 | A1 * | 1/2004 | Zinda | 707/1 |
| 2004/0039732 | A1 * | 2/2004 | Huang | 707/3 |
| 2004/0049736 | A1 * | 3/2004 | Al-Azzawe et al. | 715/513 |
| 2005/0091258 | A1 * | 4/2005 | Snover et al. | 707/102 |

(Continued)

FOREIGN PATENT DOCUMENTS

EP 0371229 A2 6/1990

OTHER PUBLICATIONS

Dave Grundgeiger, SQL and XML: Use XML to invoke and return stored procedures ove the web, Aug. 2001, pp. 4-5.*

(Continued)

*Primary Examiner*—John R. Cottingham
*Assistant Examiner*—Sherief Badawi
(74) *Attorney, Agent, or Firm*—Workman Nydegger

(57) ABSTRACT

A system and/or methodology that employs a non-relational (e.g., XML (extensible markup language)) query language to access stored procedures employed in connection with relational (e.g., SQL (structured query language)) database management systems is provided. Stored procedures in SQL enable the predetermination of queries that can be executed against the relational database. The invention bridges the gap between non-relational query languages and relational data stores. In other words, the invention enables the integration of non-relational query languages with relational data stores. The invention can define a view of the relational data in the current data model, convert data from relational to non-relational format and provide a mechanism in which a stored procedure can be referenced from the non-relational query language, using, for example, a function.

14 Claims, 9 Drawing Sheets

U.S. PATENT DOCUMENTS

| | | | |
|---|---|---|---|
| 2005/0171934 A1* | 8/2005 | Yuknewicz et al. | 707/3 |
| 2005/0187917 A1* | 8/2005 | Lawande et al. | 707/3 |
| 2006/0031204 A1* | 2/2006 | Liu et al. | 707/3 |
| 2006/0100989 A1* | 5/2006 | Chinchwadkar et al. | 707/3 |
| 2006/0136383 A1* | 6/2006 | Golla | 707/3 |

OTHER PUBLICATIONS

American National Standards Institute for Information Systems, Database Language SQL, ANSI X3.135, 1986, pp. 63-65.

Scott Boag, Don Chamberlin, Mary F. Fernandez, Daniela Florescu, Jonathan Robie, and Jerome Simeon, XQuery 1.0: An XML Query Language, Jul. 23, 2004, 207 pages, accessible at http://www.w3.org/TR/2004/WD-xquery-20040723/, last accessed on Nov. 9, 2005.

"XQuery 1.0: An XML Query Language," W3C Working Draft, Oct. 29, 2004, pp. 1-168, http://www.w3.org/TR/2004/WD-xquery-20041029/, last accessed Feb. 22, 2007.

European Search Report dated Feb. 22, mailed Mar. 6, 2007 for European Application No. EP 05 11 3074, 9 pages.

* cited by examiner

INTEGRATION OF A NON-RELATIONAL QUERY LANGUAGE WITH A RELATIONAL DATA STORE

TECHNICAL FIELD

This invention is related to data processing and data management, and more particularly to the integration of non-relational query languages with relational data processing environments.

BACKGROUND OF THE INVENTION

Relational databases are widely used to maintain data. Currently, a vast majority of the world's data stores are based on the relational data-model. Accordingly, access is most often dominated by variants of the SQL (Structured Query Language) standard. For example, many corporations maintain organizational, product and customer data in SQL compatible databases. SQL is a language used to interrogate and process data in a relational database. Originally developed for use in connection with mainframes, most database management systems (DBMSs) that are designed for client/sever environments support SQL.

Ad hoc or non-standardized queries can be used in connection with relational DBMSs to identify information based upon defined criteria. In other words, an ad hoc query can be composed to answer a question when a need arises. For example, an ad hoc query can be composed to identify all people that reside within the geographical boundary of a particular zip code.

However, for a number of reasons, many database administrators refrain from granting users ad hoc query capability. One reason is that an ad hoc query having many complicated parameters can be written and executed such that the performance of the server hosting the database is compromised. Another reason is that of security. Often times a database includes personal or sensitive data (e.g., social security and credit card account numbers). Granting users ad hoc permissions can sometimes compromise the security and confidentiality of this information.

For these reasons, database administrators frequently employ "stored procedures" which in effect are built-in queries where only small parts (e.g., parameters) are changeable. For example, a stored procedure can be defined to identify customers having a place of business in a particular zip code. In accordance with this exemplary stored procedure, the user would only have to input the value of the zip code in order to obtain the result(s). In other words, a user would call into the stored procedure and pass along a desired zip code as an identified parameter.

Stored procedures are a cornerstone feature of the SQL standard and are similar to functions in typical programming languages, which enable database administrators to predetermine the queries executed against the database. This query predetermination can provide an additional level of security and performance predictability in the database behavior. Many users of relational databases rely exclusively on stored procedures thereby disallowing the ability for arbitrary (e.g., ad hoc) queries to be consumed by the database.

In the recent past, there has been an insurgence of new technology called XML (Extensible Markup Language) that describes a method to represent data and to send data to partners for business applications. XML allows designers to create their own customized tags that can enable the definition, transmission, validation, and interpretation of data between applications and between organizations.

Accordingly, XML query languages have been created specifically to query the XML data. By definition, these languages have been unable to query a relational data-model database. The lack of this query ability creates a disparity in that these data access methods and/or languages are incompatible with most existing data stores. For example, a large amount of data is maintained in relational databases but corporations would like to access it via XML. By doing so, the corporations can develop applications and interact with their business partners utilizing XML. In other words, a disparity in compatibility exists since there are XML data formats, relational data formats, XML query languages and relational query languages.

Recent developments have been directed to computerized systems and methods for transforming the rowset (e.g., SQL) results of a query into a hierarchical (e.g., XML) data stream. However, an unsolved problem exists directed to employing non-relational (e.g., XML) query languages to access data via stored procedures thereby obtaining the results from a relational (e.g., SQL) database. Therefore, there is a substantial unmet need for a system that can employ an XML query language to obtain information from a relational data store. More particularly, what is needed is a system and/or method that permits a non-relational query language to be employed to call a stored procedure within a relational data store to access data therein.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention disclosed and claimed herein, in one aspect thereof, comprises a system and/or methodology that employs a non-relational (e.g., XML) query language to access stored procedures employed in connection with relational (e.g., SQL) DBMSs. Stored procedures in SQL enable the predetermination of queries that can be executed against the relational database. As described supra, there has been a large amount of recent research in non-relational data-model query languages. By definition, these languages are unable to query a relational data-model database. The lack of this ability creates a disparity in that these data access methods are incompatible with relational data stores. The invention bridges this gap and enables the integration of non-relational query languages with relational data stores.

Aspects of the invention provide stored procedure support in non-relational query languages from non-relational query languages. This support can be effected by (1) defining a view of the relation data in the current data model and (2) providing a mechanism in which the stored procedure can be referenced from the non-relational query language, using, for example, a function.

In one aspect a system that facilitates data access from a relational data store via a non-relational query component is provided. In accordance with this aspect, an integration component can convert a function defined within the non-relational query component into a call to a stored procedure. It will be understood that the stored procedure can facilitate access to data within the relational data store. Moreover, a conversion component can be employed that converts the data retrieved from the relational data store (e.g., SQL) to a non-relational format consistent with the non-relational query component (e.g., XML).

In one aspect the data is dynamically typed data. An alternate aspect is directed to a system whereby the data is statically typed data. A parameter or set of parameters can be passed to identify the stored procedure as well as to define criteria to be employed by the stored procedure. In statically typed aspects, a component can be employed which can validate the parameter(s) and the data in relation to a type.

Alternate aspects employ logic and reasoning mechanisms that facilitate integration in connection with the invention. For example, rule based and/or artificial intelligence mechanisms can be employed which facilitate decision-making functionality of the interface component.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
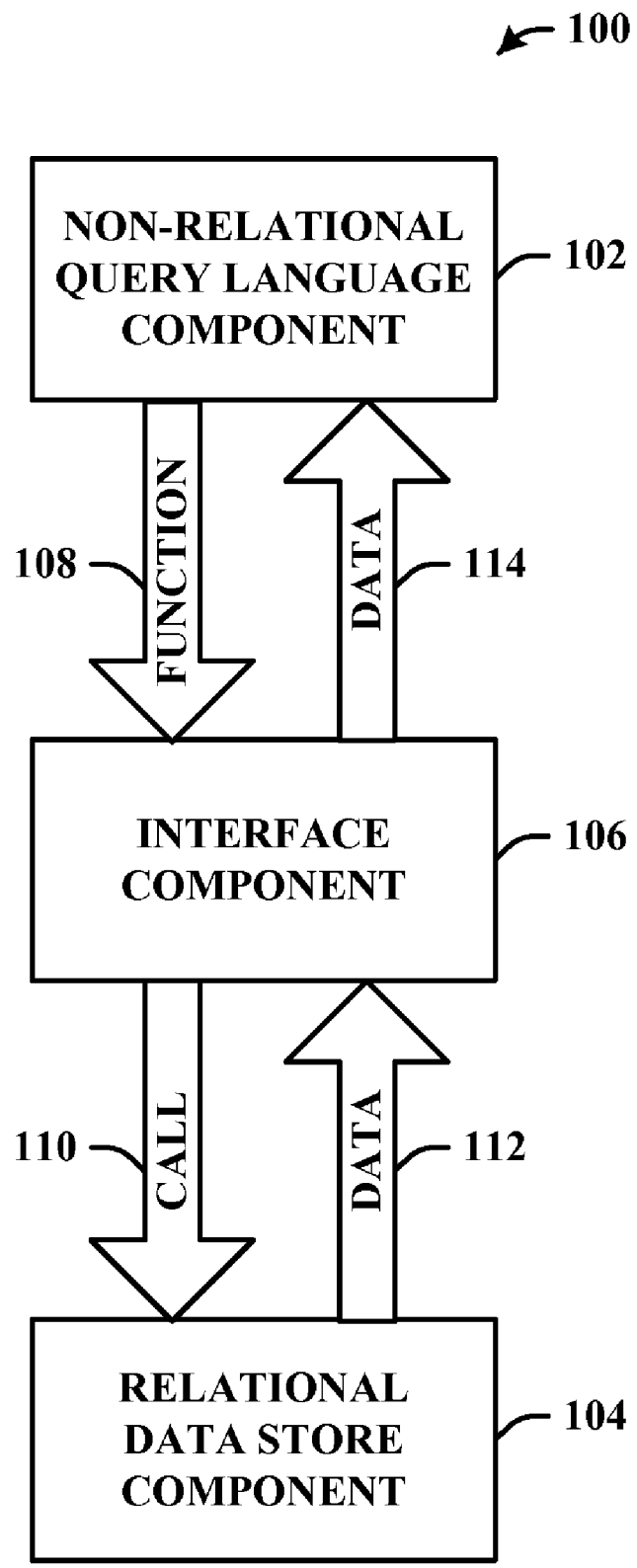
FIG. 1 illustrates a general component block diagram of a system having an interface component that facilitates integration between a non-relational query language and a relational data store in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to FIG. 1, a system 100 that facilitates integration of non-relational query languages with relational data store environments in accordance with an aspect is shown. Generally, system 100 includes a non-relational query language component 102, a relational data store component 104 and an interface component 106. More particularly, the system of FIG. 1 can employ the interface component 106 to effect a call into a stored procedure associated with the relational data store component 104 and to retrieve the results as if they were formatted consistent with the non-relational query language component (e.g., XML). Therefore, instead of having to rely on relational query languages (e.g., SQL) to obtain this information, a non-relational query language component 102 can be directly employed to access data within the relational data store component 104.

In accordance with the invention, the non-relational query language component 102 can represent any non-relational query language known in the art including, but not limited to, an XML query language. Although aspects directed to the use of an XML query language are described herein, it is to be understood that the novel aspects of the subject invention can be employed in connection with any non-relational query language component 102 without departing from the spirit and scope of the invention and claims appended hereto.

In operation, a function 108 can be defined via the non-relational query language component 102 and communicated (e.g., transmitted) to the interface component 106. For example, a function 108 defined in the query can reference a stored procedure by which data can be requested from the relational data store component 104. The interface component 106 can receive and analyze the function 108 thereby generating a call 110 to be transferred to the appropriate stored procedure within the relational data store component 104.

Once the stored procedure is executed in connection with the relational data store component 104, data 112 can be returned to the interface component 106. Because the data 112 is generated via the relational data store component 104, it should be understood that this data (e.g., 112) can be in tabular format. The interface component 106 can facilitate conversion of the tabular formatted data 112 into a non-relational data format (e.g., data 114) in accordance with a view definition process. The functionality of the interface component 106 will be described in greater detail below. The concepts by which the interface component 106 can access a stored procedure in response to a non-relational query language component 102 and format the data received via the stored procedure can be described with respect to two disparate features, a view definition feature and a stored procedure reference feature. Each of these disparate features is discussed in detail infra.

First, with respect to the view definition feature, the interface component 106 can define a view of the relational data contained within a current data model. There are typically two methods in which this access and format conversion can be effected. The first method is via a canonical view. In other words, there can be a predetermined reshaping of the relational data to conform to the target data model (e.g., XML). The second method involves defining a custom view of the relational data to the current data model. This second approach can be particularly more flexible as it allows custom logic to be applied in the shaping process thus allowing for customized shaping. It is to be understood that "shaping" and "mapping" are synonymous terms as used herein. This first feature of defining the view of the relational data in order to provide mechanisms for conversion to a target data model (e.g., XML) are described in detail in U.S. Pat. No. 6,708,164 entitled Transforming Query Results into Hierarchical Information and filed on Mar. 17, 2000, the entirety of which is incorporated herein by reference. Following is a detailed discussion of the second feature (e.g., stored procedure reference) that facilitates requesting and obtaining relational data via a non-relational query language.

The second feature can employ a mechanism in which a stored procedure can be referenced and/or accessed from the non-relational query language. In DBMSs, stored procedures can refer to a program (e.g., an SQL program) that is stored in the database. Of course, this stored program can be executed by a call directly from the client or from a database trigger. It will be appreciated that because the SQL procedure is stored in the database, it does not have to be replicated in each client. As such, stored procedures can reduce programming effort especially when different client user interfaces and development systems are used. Triggers and stored procedures can be built into DBMSs used in client/server environments.

As discussed supra, in one aspect, the stored procedure reference can be made via the programming construct known as a function. A function is typically an encapsulated piece of logic that can be reused by several components. A query language (e.g., non-relational query language component 102) can enable a specific extension function 108, which when called, can access the stored procedure within the relational data store component 104. Accordingly, tabular data 112 and reformatted data 114 can be returned via the shaping process of the interface component 106 described supra.

Figure 2:
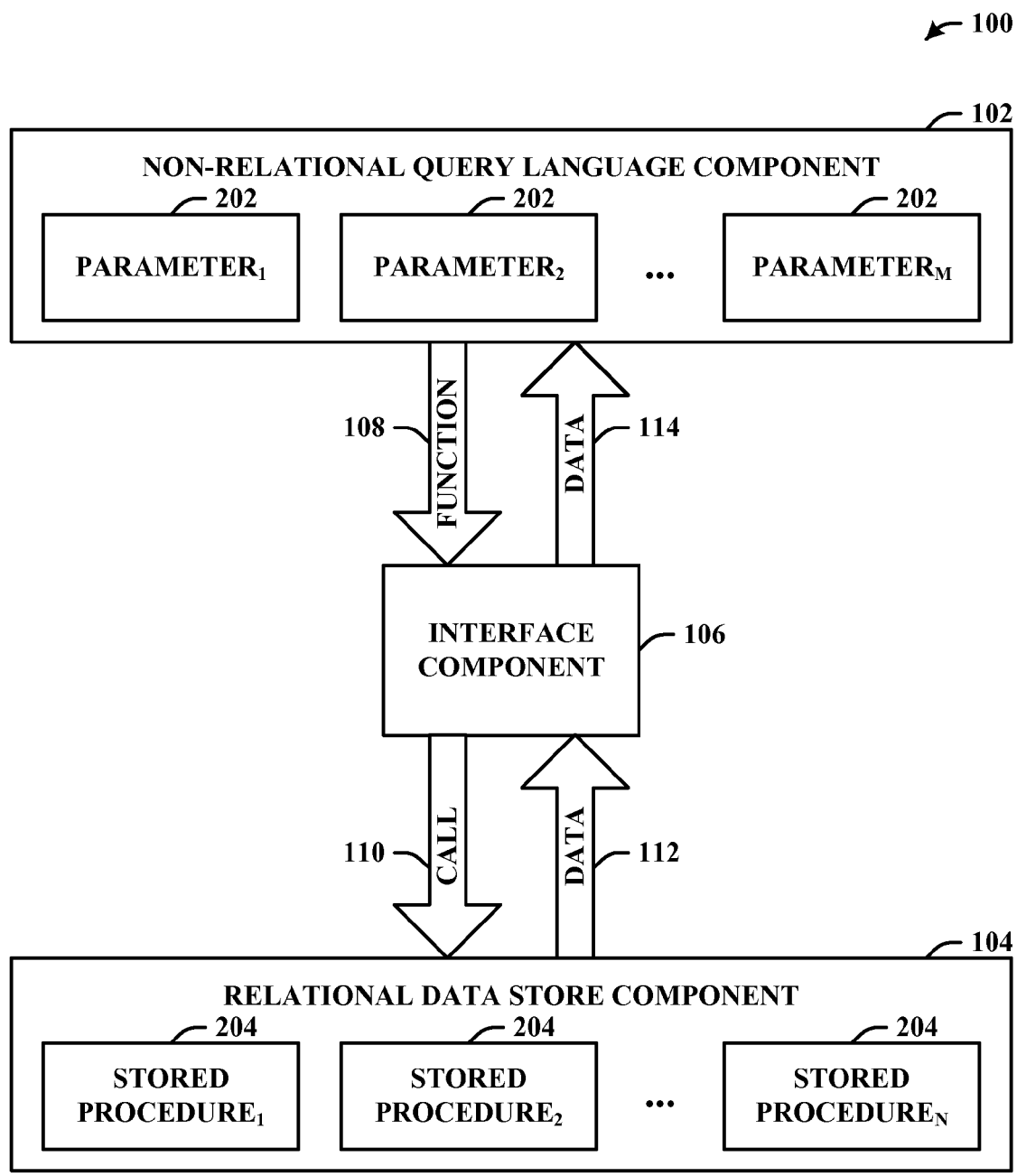
FIG. 2 illustrates a general architectural diagram of an exemplary integration between a non-relational query language and a relational data store in accordance with a dynamically typed aspect of the subject invention.
Figure 3:
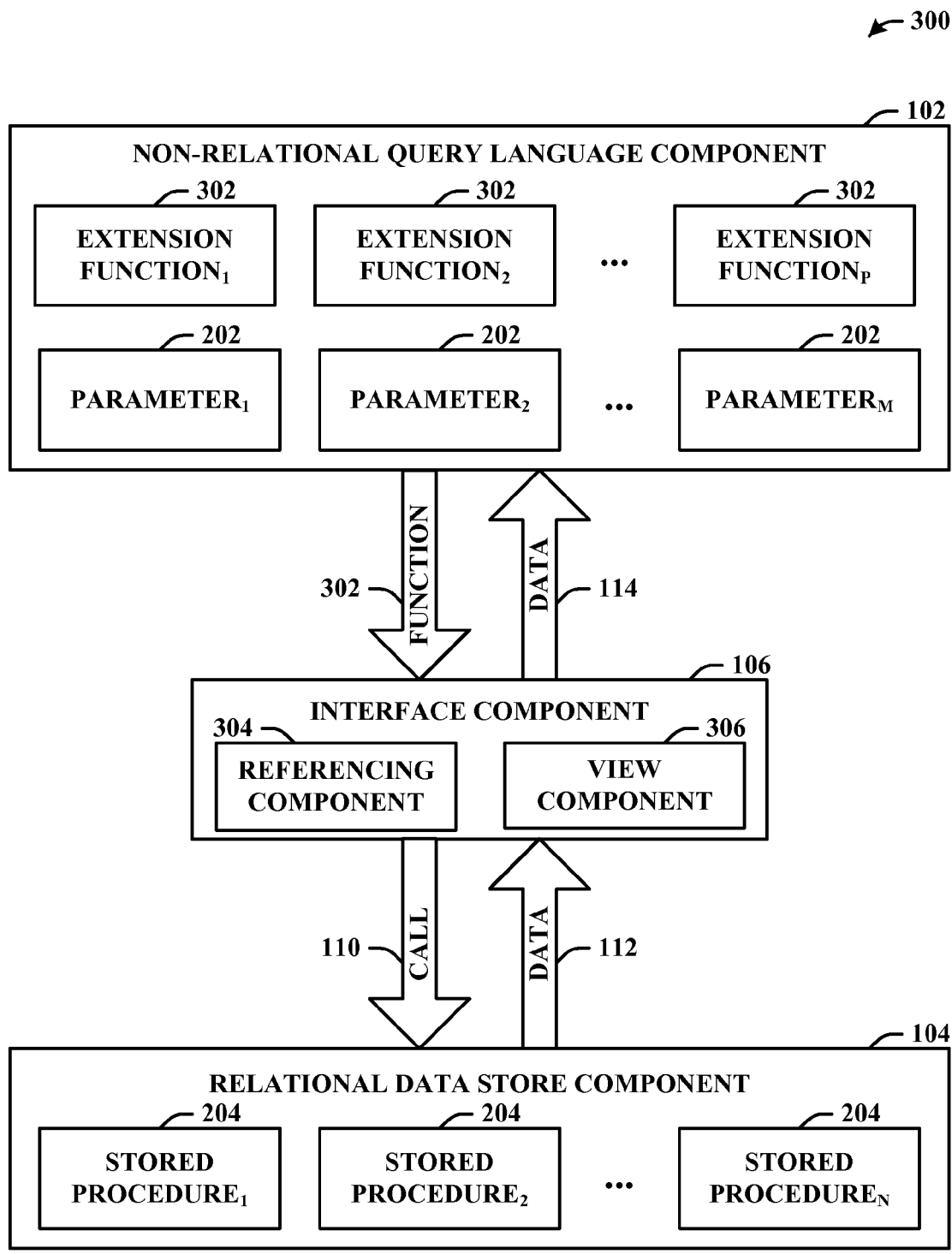
FIG. 3 illustrates a general architectural diagram of an exemplary integration between a non-relational query language and a relational data store in accordance with a statically typed aspect of the subject invention.
Figure 4:
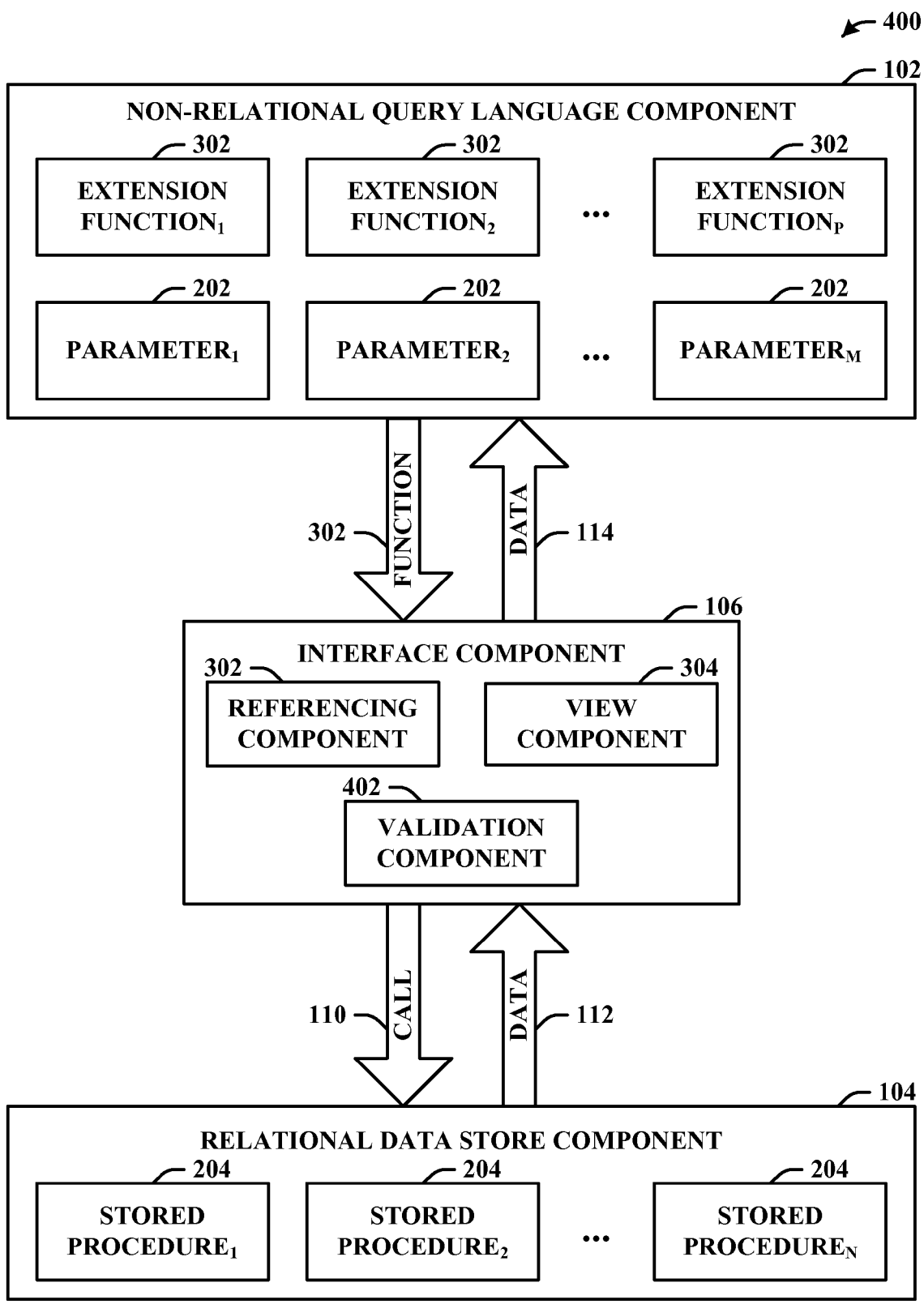
FIG. 4 illustrates a general architectural diagram of an alternative statically typed aspect that facilitates validation in accordance the invention.

In accordance with features of the invention, aspects are described with respect to the assignment of types. FIG. 2 is directed to an aspect that employs a dynamically typed or late binding query language. On the other hand, FIGS. 3 and 4 are directed to aspects that employ a statically typed or early binding query language. It will be appreciated that a dynamically typed query language can refer to a language whereby the assignment of types to variables and expressions occurs at runtime on the conditions at that moment. To the contrary, in the early binding aspect, it will be understood that the assignment of types to variables and expressions occurs at compilation time.

Referring now to FIG. 2, a system directed to dynamically typed query languages 102 is shown. As illustrated, non-relational query language component 102 can employ parameters 1 to M, where M is an integer. Parameters 1 to M can be referred to individually or collectively as parameters 202. The relational data store component 104 can employ stored procedures 1 to N, where N is an integer. Stored procedures 1 to N can be referred to individually or collectively as stored procedures 204.

For dynamically typed query languages such as an XPath-brand query language, an implementation can employ a single extension function 108 in which a parameter 202 of the function 108 can be passed to the interface component 106 whereby the parameter 202 identifies the name of a stored procedure 204. Accordingly, this stored procedure 204 can be invoked during execution. Additional parameters 202 can also be passed to this extension function 108. It will be appreciated that these additional parameters 202 can be passed during the stored procedure call 110. In this case, a single extension function 108 can be used to access all available stored procedures 204.

By way of example, suppose a stored procedure 204 is named "GetCustomer." This particular stored procedure 204 can take a single integer valued parameter 202. In accordance with an exemplary XPath-brand non-relational query language component 102, the extension function 108 used to invoke this stored procedure 204 and return the results as XML (e.g., data 114) can be:

Access-Stored-Proc("GetCustomers", 345)/Order [@id=5]

This exemplary query would invoke the "GetCustomers" stored procedure 204 with a value of the parameter 202 of "345." In this example, both "GetCustomers" and "345" are passed via parameters 202 into the function 108 (e.g., "Access-Stored-Proc"). The results (e.g., data 112) of this stored procedure 204 could then be transformed into an XML fragment (e.g., data 114) and the remaining portion of the XPath query, if one existed, could be executed over this fragment. It is to be understood that any number of queries can be effected in response to a stored procedure call. Although the exemplary function is named "Access-Stored-Proc," it should be understood that any name can be utilized without departing from the functionality described herein.

With reference now to FIG. 3, an alternate aspect of the subject invention is shown. The aspect of FIG. 3 is directed toward a system 300 whereby the non-relational query language component 102 is a statically typed query language. For statically typed query languages 102 such as XQuery-brand languages, the exemplary system 300 can employ available stored procedure information established during compilation of the query and expose multiple extension functions 302 for access to stored procedures 204. As illustrated, non-relational query language component 102 can employ 1 to P extension functions, where P is an integer. Extension functions 1 to P can be individually or collectively referred to as extension functions 302.

It is to be understood that this aspect can expose an extension function 302 that corresponds to each stored procedure 204 available. Parameters 202 passed into these extension functions 302 can be passed along by the interface component 106 in the form of a call 110 to the stored procedure(s) 204. A referencing component 304 can effect the identification of the stored procedure 204 based upon the extension function(s) 302. A view component 306 can be provided to define the view of the relational data of the current data model as discussed supra. In particular, the view component 306 can convert the tabular (e.g., relational) format of data 112 to a non-tabular format (e.g., non-relational) of data 114.

The following example is included in order to provide context to the invention. In one aspect, suppose a Customer has an Order History. Particularly, suppose the Customer had ten orders with one hundred corresponding Products. In this scenario, a hierarchy would be formed. In other words, a Customer is related to an Order History, the Order History is related to Orders and finally, the Orders are related to Products.

It will be understood that a relational database (e.g., SQL) is not capable of storing this hierarchical relationship. Instead, there is a concept called "normalization" in a relational environment whereby the information is stored in a tabular manner and the structure can be altered to function accordingly. The normalization process can break down data into record groups thereby providing for more efficient processing. Throughout the process, data can be identified by a key field in the record.

Continuing with the example, Ordering information can be identified by Order Number and Customer information can be identified by Customer Number. However, the database does not understand that this Customer is associated with this Order. Often times in this non-relational space, these Orders can be associated with this Customer. The view component 306 can look at the relational data store component 104 and can format the resulting data (e.g., 112) to show the relationship thus generating data 114. The view component 306 described herein can employ similar functionality as that described in the aforementioned U.S. Pat. No. 6,708,164, the entirety which is incorporated herein by reference.

Because the non-relational query language component 102 of this aspect is statically typed, the system 300 can ensure and validate that the parameters 202 employed correspond to a specific data type(s). As well, the type(s) of the return data (e.g., data 112) with respect to the stored procedure (as dictated by the view component 306) can be verified to ensure that it is consistent with the remainder of the query. These validation aspects will be discussed in greater detail with reference to FIG. 4 infra.

In addition to the view component 306, another novel aspect of the subject invention is directed to the referencing component 304. The referencing component 304 can facilitate receiving a request from a non-relational query language component 102 and accessing data retained within the relational data store component 104. In other words, a novel feature of the subject invention is directed to systems and methods that enable communication in the terms of the non-relational query language component 102 (e.g., XML) whereby information (e.g., data) can be specified and obtained from the relational database 104. This information can be accessed via stored procedures 204 associated with the relational data store 104. As discussed supra with reference to the view component 306, once the relational information is obtained (e.g., data 112), conversion of the relational data 112 can be effected to generate data 114 in a format compatible with non-relational environments (e.g., XML).

Although the interface component 106 is described as a separate component, it is to be appreciated that the functionality of the interface component 106 can be incorporated into a compiler of an existing system. For example, whenever a user invokes a query, the compiler can convert the text of the non-relational query into language and/or code (e.g., call 110) that is executable by the computer. Essentially, aspects of this invention can be viewed as a new feature of the compiler thus effecting the ability to convert the query language (e.g., function 302) exposed by the non-relational query language component 102 into a call 110 recognizable by a stored procedure 204 of the relational data store component 104.

Referring back to the example, assume implementation in an XQuery-brand environment. Suppose that there are multiple Products in each Order, multiple Orders make up the Order History and each Customer has an Order History. Additionally, there is a stored procedure 204, which can retrieve a Customer by an identification number. In accordance thereto, the relational data store component 104 can expose a stored procedure 204 that can retrieve a Customer by identification number. As illustrated in FIG. 3, a user can pass a parameter (e.g., integer) 202 in a function 302 to the interface component 106. The interface component 106, via the referencing component 304, can convert the function 302 into a call 110 to the specified stored procedure 204. Subsequently, the stored procedure 204 can be executed thereby returning the requested data 112 form the relational data store component 104.

Because the data 112 is retrieved from the relational data store component 104, the data 112 will be returned in multiple sets of data. Conventionally, since the non-relational (e.g., XML) language does not employ relational mechanisms, manual interpretation of which Products are related to the returned Orders would be necessary. However, in accordance with the invention, the view component 306 can be employed as described supra to establish the relationship. It will be appreciated that the relational database employs a nesting (e.g., hierarchical) format, which, if converted, could be employed in the XML environment.

The subject invention enables access to a stored procedure 204 whereby the hierarchy stored by the relational data store component 104 can be automatically accessed, converted and employed in a format consistent with the non-relational environment (e.g., XML). In other words, in accordance with the invention, from within the XML environment, the hierarchical, nested structure can be referenced and used. In accordance to the example, within a Customer, a user can look into an Order to find a particular Product ordered.

With reference again to FIG. 3, in order to access data 112 from the relational data store component 104, a user can employ an extension function 302 via the non-relational query language component 102. The extension function 302 can be defined within the non-relational query language component 102. It will be appreciated that a "function" can refer to self-contained software routine (e.g., stored procedure) capable of performing a task for the program it is written in or for some other program. Because the aspect employs a statically typed scenario, a parameter 202 that represents the name of a desired stored procedure 204 can be passed as the function 302.

The interface component 106 can translate the defined extension function 302 into a call 110 which can be understood by a stored procedure 204 within the relational data store component 104. The call 110 can be a request by a program to use a subroutine (e.g., stored procedure 204). Of course, the subroutine (e.g., stored procedure 204) can be large and can perform a significant amount of processing. As well, the subroutine can be as small as identifying a single field and returning a result. As illustrated in the statically typed aspect of FIG. 3, the function 302 and subsequent call 110 can specify the name of the stored procedure 204 followed by any values or parameters 202 that are to be passed to the stored procedure 204.

When the stored procedure 204 is called, the operation can be performed thus returning the results (e.g., data 112) as illustrated. Although the described aspect is directed toward a stored procedure 204 internal to a data store component (e.g., relational data store component 104), it is to be appreciated that the stored procedure 204 can be a program and/or subroutine external to the data store component.

By way of further example, in the statically typed example, a stored procedure named "FindCustomers" can be directly called via the non-relational query language component 102. Accordingly, "last name" and the "zip code" can be added as parameters 202 thus defining criteria for the stored procedure 204. Therefore, this function 302 is able to call into this specified stored procedure 204 (e.g., "FindCustomers") and return the results (e.g., data 112) corresponding to the defined parameters 202. Next, the results (e.g., data 112) can be converted in a manner suitable for this query language 102 to further post process.

As described supra, the aspect of FIG. 2 is directed to a non-statically typed mechanism. In accordance thereto, there can be one standard extension function 108 (e.g., Access-Stored-Proc) that can facilitate access to the stored procedure 204. In other words, the compiler that effects access to a stored procedure 204 can expose a single function 108. Additionally, one of the parameters 202 of the function 108 can identify which stored procedure 204 to call.

On the other hand, the aspect of the subject invention illustrated in FIG. 3 (and FIG. 4 described infra) is directed to a statically typed aspect. It will be appreciated that the non-relational query language component 102 can employ the concept of types to provide additionally functionality. For example, in the statically typed or early binding scenario, the non-relational query language component 102 can be aware of the type of data contained within the relational data store 104 thereby employing analysis and/or validation techniques. Conventionally, it will be understood that common data types can include numeric, string, Boolean (e.g., true/false) or the like.

Referring to the aspect of FIG. 4, the non-relational query language component 102 can enforce these types with respect to the relational data store component 104. By way of example, if a user invokes a query that employs Boolean logic "true" plus "true", the non-relational query language component 102 could identify that this is a nonsensical action thus effecting notification of the same. In accordance with the invention, the non-relational query language component 102 can take advantage of this kind of logic. In doing so, the data contained within the relational data store component 104 can be categorized in terms of a specific type(s).

Returning to the example, in accordance with a statically typed aspect, a "Customer" type and an "Order History" type can be defined. Therefore, if a function is employed to identify "Products" of a "Customer", the compiler (e.g., validation component 402) can prompt a notification that indicates an error based upon data type. In other words, "Customers" do not have "Products" associated directly therewith. In the example, a "Customer" has an "Order History," which has "Orders," which have "Products." However, "Customers" do not directly have "Products." Therefore, this request could be identified as an error.

As illustrated, a validation component 402 can be employed to validate the parameters 202 and type of the returned data 212 in accordance with a predefined type in relation to a stored procedure 204. By way of example, suppose a stored procedure 204 named "FindCustomer" in the relational data store 104 takes two string parameters 202. The first parameter 202 is "firstname" and the second parameter 202 is "lastname." Accordingly, in an exemplary XQuery-brand environment, the extension function 302 used to invoke this stored procedure 204 and return the results (e.g., data 114) as XML can be:

FindCustomer("George", "Washington")

In order to ensure the query is statically correct, the interface component 106 (e.g., validation component 402) can error on the query from the non-relational query language component 102 if parameter 202 type(s) does not conform to the stored procedure 204. As well, an error notification can be generated if the returned data 112 type is incompatible with the rest of the query (e.g., XQuery-brand query). This functionality should be better understood with reference to the following example Suppose the following XQuery is provided:

FindCustomer("George", 123)

In the query statement above, the "FindCustomer" stored procedure 204 does not accept integer values as parameters 202. Since the statically typed XQuery compiler (e.g., validation component 402) had the necessary static information regarding the stored procedure 204, the validation component 402 is able to determine that this query is incorrect. Additionally, the validation component 402 can provide similar detection and validation based upon the type of the resulting data (e.g., 112) retrieved via the stored procedure 204.

In the aspect described with reference to FIG. 2, the interface component 106 and/or compiler is not aware of any of this type information (e.g., dynamically typed). However, in the statically typed aspect of FIG. 4, the compiler knows the type of the information in the relational data store component 104. Therefore, the interface component 106 is able to understand the type and to expose a stored procedure 204 as a strongly typed method. In accordance thereto, the interface component 106 can employ a validation component 402 to check the validity of the returned data (e.g., data 112) and to require that the parameters 202 sent to the stored procedure 204 are correct with respect to known type(s).

It will be understood that the aspect of FIG. 4 is directed to a statically checked mechanism. This usually depends on whether the query language was designed to support static typing or not. As described, in a statically typed aspect the stored procedure itself can be exposed as a parameter to an extension function. In other words, since the stored procedure is known ahead of time, a construct can be created that represents the stored procedure directly. It should be understood that if information regarding type is known before execution, the invention can check the validity of data and of the function.

Figure 5:
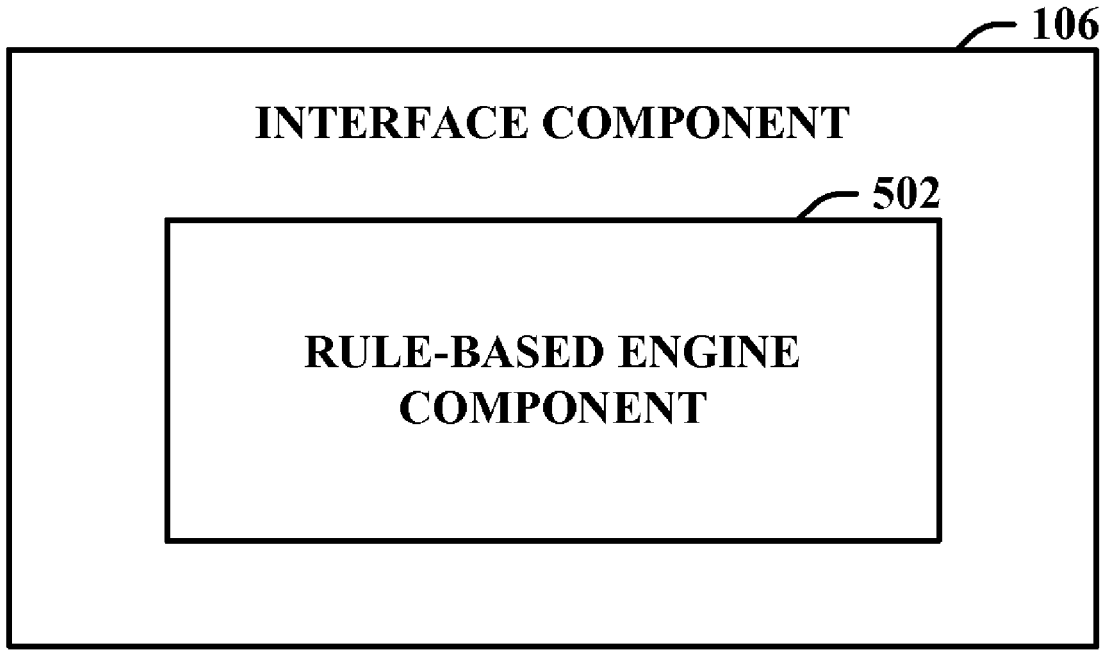
FIG. 5 illustrates a component block diagram of an alternative interface component that employs a rule-based decision mechanism in accordance with an alternate aspect of the subject invention.

Continuing with the example and with reference to FIG. 5, a more detailed schematic view of the interface component 106 is shown. As illustrated, interface component 106 can generally include a rule-based engine component 502. As will later be described with reference to FIG. 6, an optional artificial intelligence (AI) component (not shown) can be used together with, or in place of, the rule-based engine component 502 to automatically infer an action or set of actions to be employed in connection with the functionality of the interface component 106 discussed supra.

In the exemplary aspect of FIG. 5, the rule-based engine component 502 can be programmed or configured in accordance with a predefined preference (e.g., rule). For example, a rule (e.g., logic) can be constructed to automatically prioritize queries based upon a defined hierarchy. More particularly, a rule can be established to take into consideration the specific characteristic(s) of a query, processing time limit(s), information type(s), etc. to prioritize and process queries. The rule-based engine 502 can facilitate application of the rule whereby control of the interface component 106 can be altered accordingly.

Figure 6:
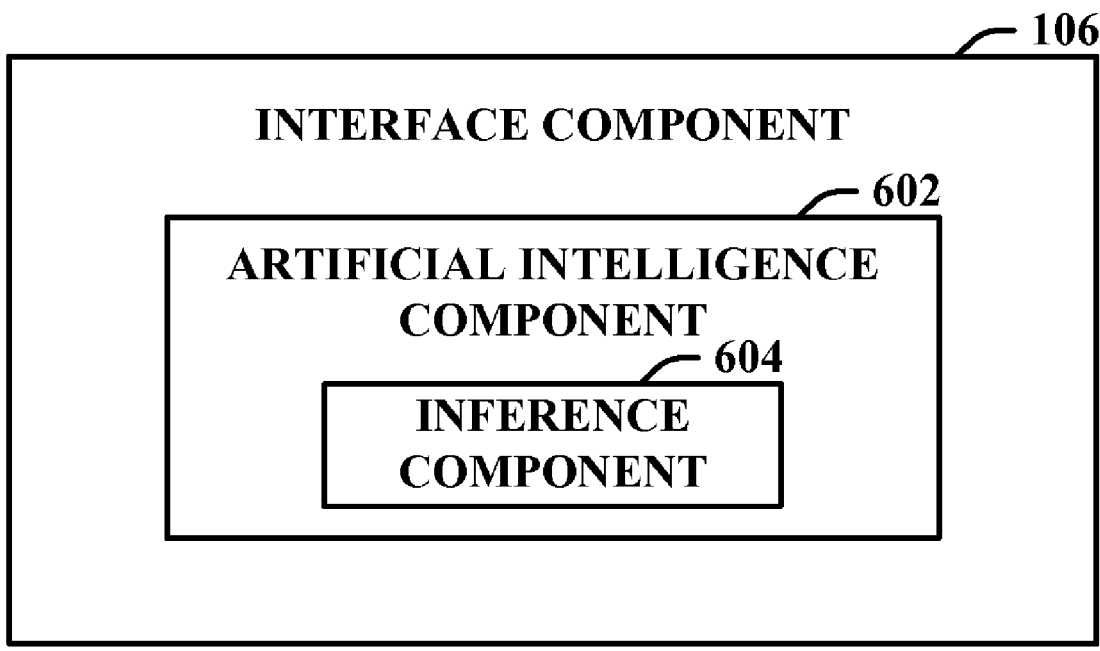
FIG. 6 illustrates a component block diagram of an alternative interface component that employs an artificial intelligence-based decision mechanism in accordance with an alternate aspect of the subject invention.

A schematic diagram of another alternative aspect of the subject invention is illustrated in FIG. 6. The interface component 106 of this aspect illustrated in FIG. 6 employs an AI component 602 to automatically infer and/or predict an action. As illustrated, this alternate aspect can optionally include an inference module 604 that facilitates automatic control and/or operation.

In accordance with this aspect, the optional AI components 602, 604 can facilitate automatically performing various aspects (e.g., control prioritization, process limitations) of the subject invention as described herein. The AI component 602 can optionally include an inference component 604 that can further enhance automated aspects of the AI component utilizing, in part, inference based schemes to facilitate inferring intended actions to be performed at a given time and/or state. The AI-based aspects of the invention can be effected via any suitable machine-learning based technique and/or statistical-based techniques and/or probabilistic-based techniques.

In the alternate aspect, as further illustrated by FIG. 6, the subject invention (e.g., in connection with controlling query (e.g., stored procedure) execution and/or operation) can optionally employ various artificial intelligence based schemes for automatically carrying out various aspects thereof. Specifically, artificial intelligence components 602, 604 can optionally be provided to implement aspects of the subject invention based upon artificial intelligence processes (e.g., confidence, inference). For example, a process for determining the prioritization of query execution based upon user preferences or processing requirements can be facilitated via an automatic classifier system and process. Further, the optional artificial intelligence components 602, 604 can be employed to facilitate an automated process of rendering and/or formatting received data based upon a predicted and/or inferred preference.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's can be configured via a learning or training phase within a classifier constructor and feature selection module. In other words, the use of expert systems, fuzzy logic, support vector machines, greedy search algorithms, rule-based systems, Bayesian models (e.g., Bayesian networks), neural networks, other non-linear training techniques, data fusion, utility-based analytical systems, systems employing Bayesian models, etc. are contemplated and are intended to fall within the scope of the hereto appended claims.

Other implementations of AI could include alternative aspects whereby, based upon a learned or predicted user intention, the system can prompt for verifications. For example, the system can prompt for verification of security credentials prior to rendering sensitive and/or confidential data (e.g., social security and credit card account numbers). Likewise, an optional AI component could prompt a user to delay process of a query based upon system state.

Figure 7:
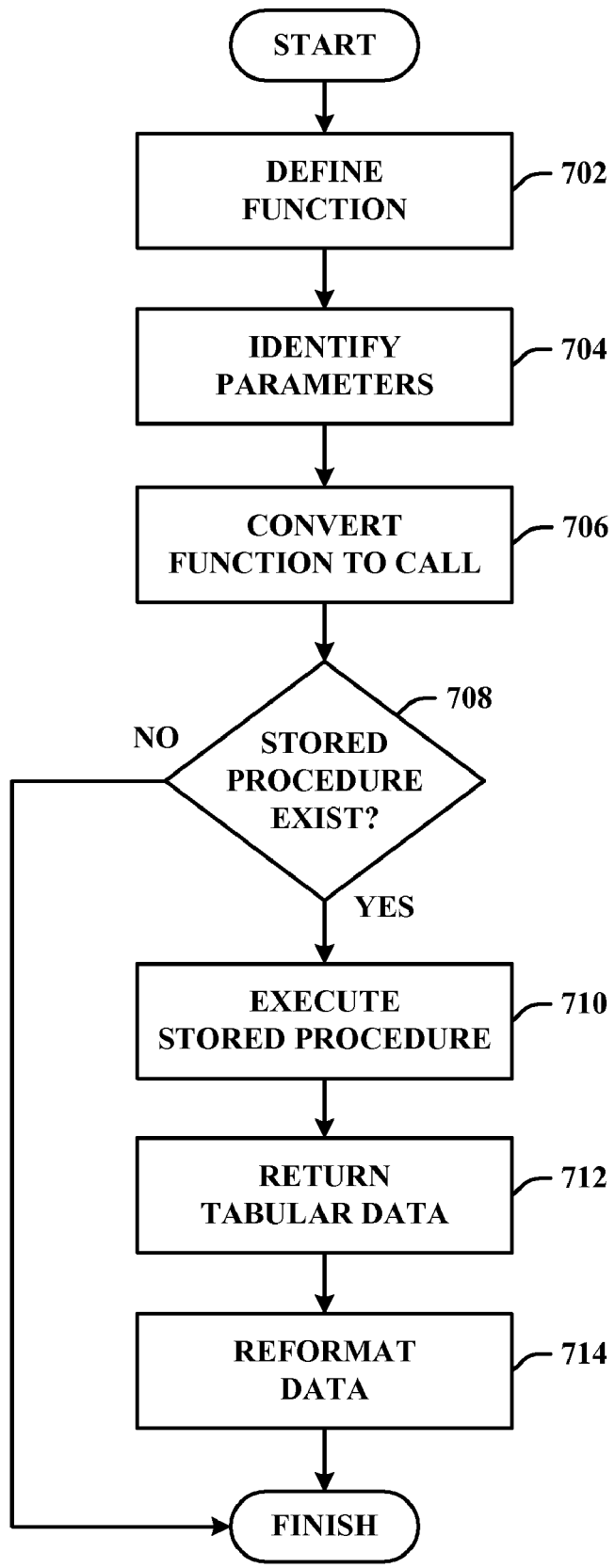
FIG. 7 illustrates an exemplary flow chart of procedures for integrating a non-relational query language with a relational data store in accordance with a disclosed dynamically typed aspect.
Figure 8:
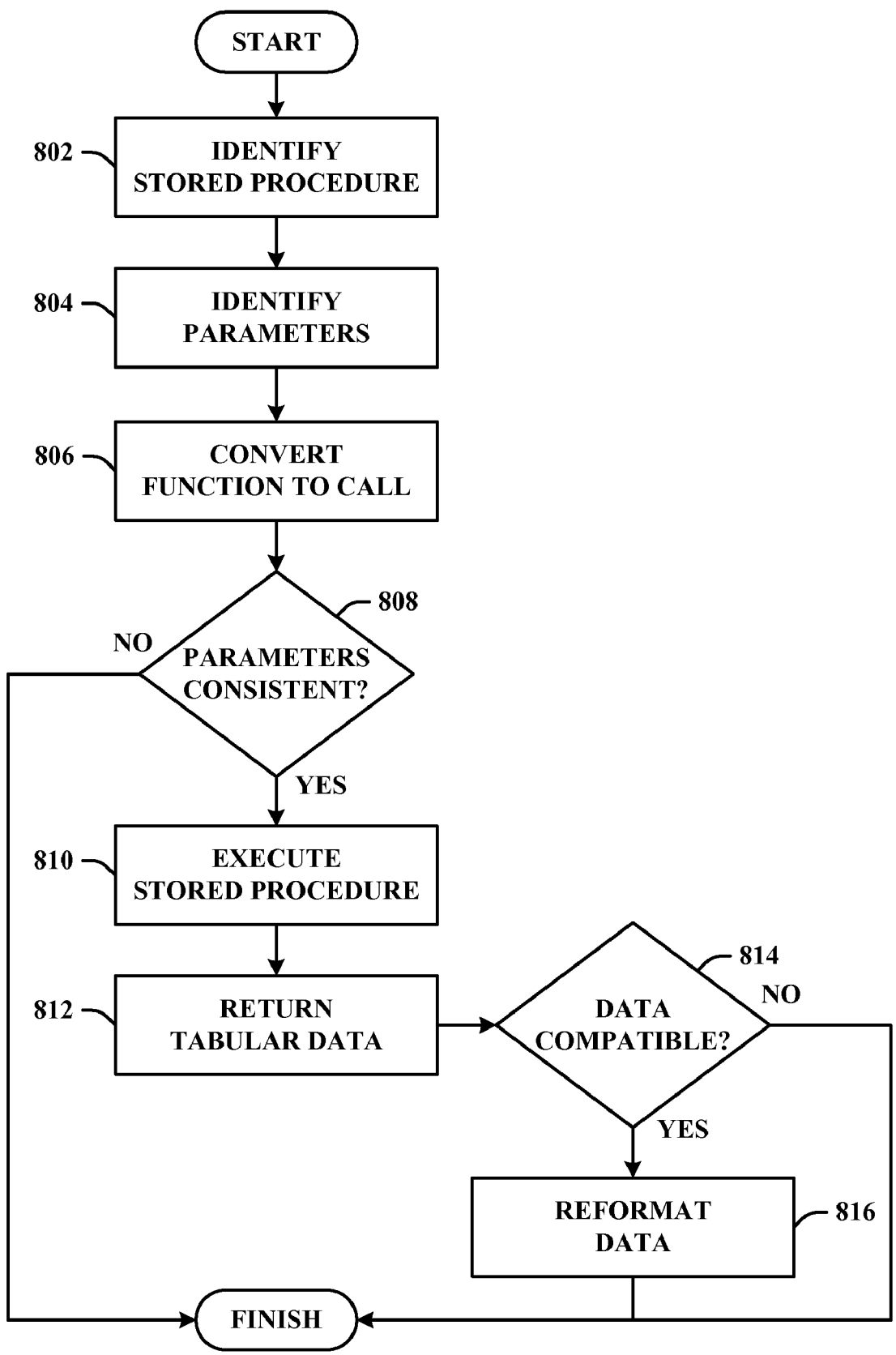
FIG. 8 illustrates an exemplary flow chart of procedures for integrating a non-relational query language with a relational data store in accordance with a disclosed statically typed aspect.

With reference to FIGS. 7 and 8, there are illustrated flow-charts in accordance to aspects of the with the subject invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Referring to FIG. 7, an exemplary methodology, which employs a dynamically typed query language component, is shown. At 702, a function to access a stored procedure is defined. As discussed supra, the function defined to access a stored procedure can take any name desired. For example, as described above, the function can be defined as "Access-Stored-Proc." At 704 parameters are identified and passed into the functions. The parameters can identify a particular stored procedure as well as variables to be employed during access of the stored procedure.

At 706, the function is converted to a call compatible with a stored procedure. For example, an interface component (e.g., referencing component) can be employed to convert the function to a stored procedure call. Next, the system attempts to locate the stored procedure. Accordingly, at 708, a determination is made if the stored procedure exists. If, at 708, a determination is made that the stored procedure does not exist, the process terminates as illustrated.

On the other hand, if, at 708, the system determines that the stored procedure does exist, the stored procedure can be executed at 710. As discussed herein, it is to be appreciated that prioritized and/or delayed stored procedure execution can be employed in connection with alternate aspects. Once executed, the stored procedure returns data at 712. It will be understood that, because the stored procedure executes in connection with a relational data store, the data returned is in tabular format. At 714, the tabular formatted data can be converted into a hierarchical format consistent with a non-relational query language (e.g., XML). This format conversion can be effected via a view definition component described above. While the aspect of FIG. 7 is directed to a dynamically typed scenario, FIG. 8 is directed to a statically typed scenario.

With respect to the statically typed aspect of FIG. 8, at 802 a stored procedure is identified. As described supra, because this aspect is statically typed, information regarding the stored procedure(s) is available and therefore can be identified via a non-relational query language. In other words, in this aspect, the function can take the name of the desired stored procedure(s). At 804, parameters are identified and added to the function. At 806, the function is converted to a call which can be interpreted by the stored procedure within the relational database.

Because the aspect of FIG. 8 refers to a statically typed (e.g., early binding) system, it will be understood that validations can be employed to ensure acceptable processing. Accordingly, at 808, a determination can be made to establish if the parameters identified are consistent with the identified stored procedure. In other words, the system can determine if the type of parameter is consistent with the stored procedure. If it is determined that the type is not consistent, the call is aborted and the process is finished. If, on the other hand, the parameters are acceptable, the stored procedure is executed at 810. Tabular data is returned from the relational data store at 812.

Again, because the aspect refers to a statically typed scenario, at 814, the returned data can be verified for compatibility with the query. For example, if additional query actions are to be employed, the system can verify that the returned data type is consistent with the additional query actions. If not compatible, the process is aborted and the methodology terminates. If, at 814, a determination is made that the data is compatible, the data can be reformatted at 816. This reformatting act can format returned tabular data into an acceptable hierarchical format consistent with the non-relational query language (e.g., XML).

Figure 9:
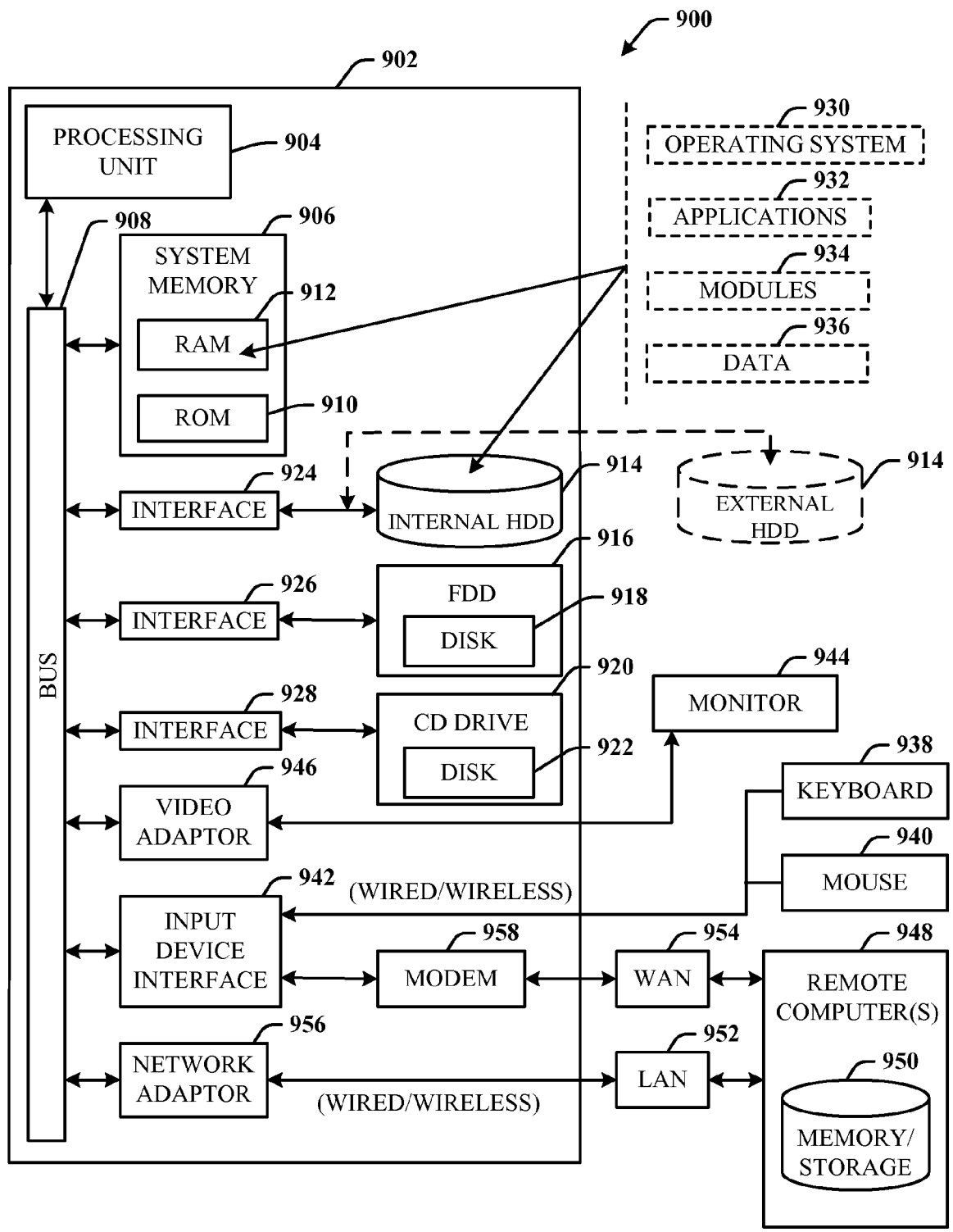
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject invention, FIG. 9 and the following discussion are intended to provide a brief, general description of a suitable computing environment 900 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, LEPROM, flash memory or other memory technology, CD-ROM, digital video disk (DYD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, there is illustrated an exemplary environment 900 for implementing various aspects of the invention that includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read only memory (ROM) 910 and random access memory (RAM) 912. A basic input/output system (BIOS) is stored in a nonvolatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the subject invention can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices, and companies, and facilitate enterprise-wide computer networks, such as intranets, all of which may connect to a global communication network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956. When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
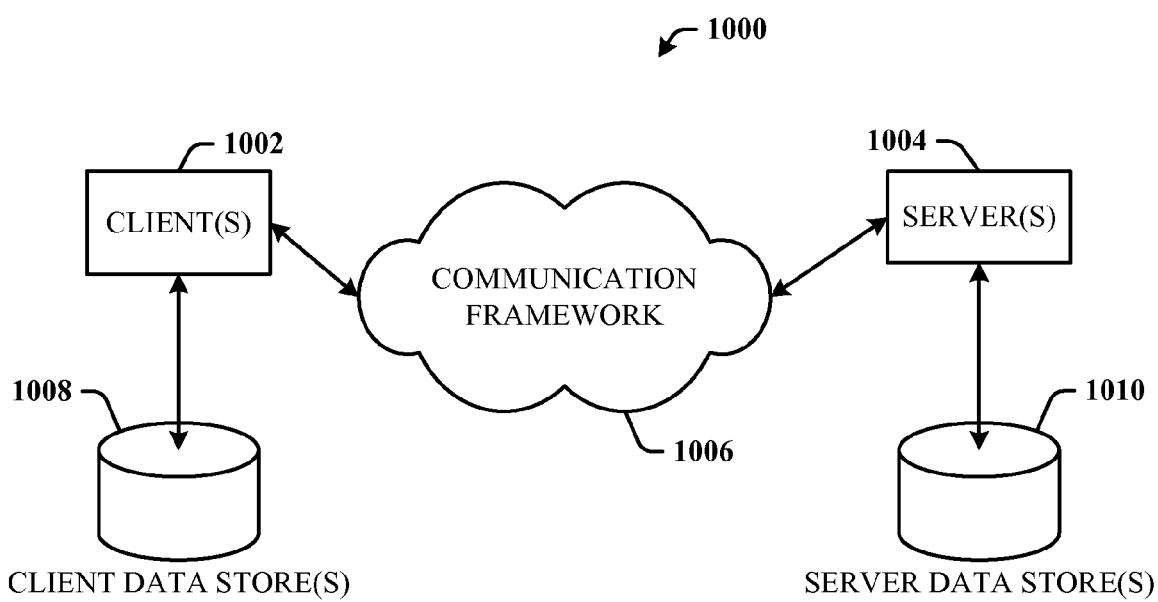
FIG. 10 illustrates a schematic block diagram of an exemplary computing environment in accordance with the subject invention.

Referring now to FIG. 10, there is illustrated a schematic block diagram of an exemplary computing environment 1000 in accordance with the subject invention. The system 1000 includes one or more client(s) 1002. The client(s) 1002 can be hardware and/or software (e.g., threads, processes, computing devices). The client(s) 1002 can house cookie(s) and/or associated contextual information by employing the subject invention, for example. The system 1000 also includes one or more server(s) 1004. The server(s) 1004 can also be hardware and/or software (e.g., threads, processes, computing devices). The servers 1004 can house threads to perform transformations by employing the subject invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer storage media encoded with a computer program for a system that facilitates data access from a relational data store via a non-relational query component in order to allow data from the relational data store to be utilized in an application employing a non-relational format, the system comprising:
  a non relational query language component comprising:
    an extension function defined in a non-relational query language and located within a query from the non-relational query component in which a parameter of the function is passed to an interface component;
  an interface component comprising:
    a referencing component that converts the extension function defined in a non-relational query language and located within a query from the non-relational query component into a call to a stored procedure; the stored procedure facilitates access to data within the relational data store wherein the extension function defined in the non-relational query language further comprises the parameter that identifies the stored procedure; a view component defining a view of the relational data of a current data model and converts the view of the relational data from a tabular format to a non-relational non-tabular format wherein the tabular data is reformatted and returned via a shaping process of the interface component conforming to the target data model; a validation component that validates data and data types for parameters provided to the stored procedure and data and data types returned from the stored procedure and generates an error notification if the data and data type for the provided parameters and the returned data and data type does not conform to the requirements of the stored procedure and if the returned data or data types are incompatible with the remainder of the non-relational query operating on the returned data;
    a classifier that automatically prioritizes queries based on user preferences utilizing a function that maps an input attribute vector to a confidence that the input belongs to a class employing probabilistic and statistical based analysis and predefined characteristics of the queries;
    and a conversion component that converts the data to a non-relational format consistent with the non-relational query component to facilitate execution of a remaining portion of the query on the data.

2. The system of claim 1, the data within the relational data store is accessed via a query constructed from a dynamically typed query language.

3. The system of claim 1, the data within the relational data store is accessed using a query constructed from a statically typed query language.

4. The system of claim 1, further comprising a rule-based engine component that provides logic that facilitates execution of the stored procedure in accordance with a predetermined rule.

5. The system of claim 1, further including an artificial intelligence (AI) component that provides reasoning that facilitates execution of the stored procedure based upon a predicted action.

6. A method for accessing data from a relational data store via a non-relational query language, the method comprising:
  Employing a processor to execute the following computer executable acts stored on a computer readable medium:
    an extension function defined in a non-relational query language and located within a query from the non-relational query component in which a parameter of the function is passed to an interface component;
    utilizing the extension function defined within the non-relational query language to facilitate identification of a stored procedure located external to the relational data store and associated with the relational data store; providing the function in a query formed using the non-relational query language wherein the parameter of the extension function corresponds to the stored procedure; converting the extension function in the query into a call for the stored procedure based upon the extension function;
    classifying and prioritizing the queries based on characteristics of each query utilizing a function that maps an input attribute vector to a confidence that the input belongs to a class employing probabilistic and statistical based analysis; validating the data types for parameters provided to the stored procedure and generating an error notification if a data type for the provided parameters does not conform to the requirements of the stored procedure; defining a view of the relational data of a current data model and converting the relational format data to a non-relational format for viewing wherein the data is reformatted and returned via a shaping process of the interface component conforming to the target data model; executing the stored procedure to access the data within the relational data store and to facilitate execution of a remaining portion of the query on the accessed data; and validating data types for data returned from the stored procedure and generating an error notification if a data type for the returned data does not conform to the requirements of the stored procedure and if the data type of the returned data is incompatible with further processing by the non-relational query based on remaining data manipulations.

7. The method of claim 6, further comprising converting the data into a format consistent with the non-relational query language.

8. The method of claim 6, further comprising passing a second parameter to the function, the second parameter identifies a criteria for the stored procedure.

9. The method of claim 6, wherein the non-relational query language is a statically typed query language.

10. The method of claim 6, wherein the non-relational query language is a dynamically typed query language.

11. The method of claim 6, the data is a data packet that communicates between the non-relational query language component and the relational data store.

12. A computer implemented system that facilitates access of a stored procedure in an SQL (Structured Query Language) environment from an XML (Extensible Markup Language) query environment, the system comprising: Employing a processor to execute the following computer executable acts stored on a computer readable medium:
  a non relational query means comprising:
    an extension function defined in a non-relational query language and located within a query from the non-relational query component in which a parameter of the function is passed to an interface component;

an interface means comprising:

means for employing an XML query including the extension function defined within an XML query language to reference a stored procedure associated with the SQL environment, the stored procedure, located external to the relational data store, is identified by the parameter of the extension function based upon the extension function that facilitates access to data within the SQL environment; means for validating the data types for parameters provided to the stored procedure and generating an error notification if a data type for the provided parameters does not conform to the requirements of the stored procedure;

means for classifying and prioritizing queries based on a defined hierarchy utilizing a function that maps an input attribute vector to a confidence that the input belong-s to a class employing probabilistic and statistical based analysis;

means for defining a view of the relational data of the a current data model and viewing the relational data in a non-relational format wherein the data is reformatted and returned via a shaping process of the interface component conforming to the target data model;

means for converting the accessed data to a format consistent with the XML query language over which a remaining portion of the XML query can be executed; and means for validating data types for data returned from the stored procedure and generating an error notification if a data type for the returned data does not conform to the requirements of the stored procedure and if the data type of the returned data is incompatible with the remaining operations of the non-relational query.

13. The system of claim 4, wherein the rule-based engine component automatically prioritizes a plurality of queries based upon one or more of specific query characteristics, processing times or information types.

14. The system of claim 2, the function accesses a plurality of stored procedures based on a value of the parameter passed to the function.

* * * * *